(12) United States Patent
Park et al.

(10) Patent No.: US 11,969,807 B2
(45) Date of Patent: Apr. 30, 2024

(54) INSERT AND CUTTING TOOL ASSEMBLY COMPRISING SAME

(71) Applicant: TAEGUTEC LTD., Daegu (KR)

(72) Inventors: Chang Gyu Park, Daegu (KR); Jae Seong Kim, Daegu (KR)

(73) Assignee: TaeguTec Ltd., Daegu (KR)

( * ) Notice: Subject to any disclaimer, the term of this patent is extended or adjusted under 35 U.S.C. 154(b) by 145 days.

(21) Appl. No.: 16/743,172

(22) Filed: Jan. 15, 2020

(65) Prior Publication Data

US 2021/0213546 A1 Jul. 15, 2021

(51) Int. Cl.
*B23C 5/20* (2006.01)
*B23C 5/10* (2006.01)
*B23C 5/22* (2006.01)

(52) U.S. Cl.
CPC .............. *B23C 5/202* (2013.01); *B23C 5/109* (2013.01); *B23C 5/2213* (2013.01);
(Continued)

(58) Field of Classification Search
CPC ........... B23C 5/207; B23C 5/202; B23C 5/20; B23C 5/109; B23C 5/2221; B23C 5/2213; B23C 5/2208; B23C 5/224; B23C 2200/0494; B23C 2200/0461; B23C 2200/0455; B23C 2200/161; B23C 2200/081; B23C 2200/168; B23C 2200/086; B23C 2200/165;
(Continued)

(56) References Cited

U.S. PATENT DOCUMENTS

| 3,629,919 A | 12/1971 | Trevarrow, Jr. |
| 6,193,446 B1 * | 2/2001 | Astrom .................. B23C 5/202 |
| | | 407/115 |

(Continued)

FOREIGN PATENT DOCUMENTS

| EP | 2 764 940 A1 | 8/2014 |
| EP | 2822719 B1 | 4/2018 |

(Continued)

OTHER PUBLICATIONS

International Search Report dated Feb. 21, 2021, in counterpart PCT application No. PCT/KR2020/016755.

(Continued)

*Primary Examiner* — Ryan Rufo
(74) *Attorney, Agent, or Firm* — Womble Bond Dickinson (US) LLP

(57) ABSTRACT

An insert configured to be assembled to a tool for cutting a workpiece, includes: an upper surface including first to fourth upper corner portions formed in respective quadrants divided by a first imaginary vertical axis and a first imaginary horizontal axis that are perpendicular to each other; and a lower surface formed below the upper surface in a height direction and including first to fourth lower corner portions formed in respective quadrants divided by a second imaginary vertical axis and a second imaginary horizontal axis that are perpendicular to each other. A lower ridge portion protruding downward in the height direction is formed on the lower surface, and extends across the second and fourth lower corner portions, which are symmetrical with respect to a center of the lower surface.

21 Claims, 17 Drawing Sheets

(52) U.S. Cl.
CPC .. *B23C 2200/081* (2013.01); *B23C 2200/161* (2013.01); *B23C 2210/168* (2013.01)

(58) Field of Classification Search
CPC ........ B23C 2210/168; B23C 2200/082; B23B 2200/161; B23B 2200/081; B23B 2200/086; B23B 2200/165; B23B 2200/082
See application file for complete search history.

(56) References Cited

U.S. PATENT DOCUMENTS

| | | |
|---|---|---|
| 6,929,428 B1 | 8/2005 | Wermeister et al. |
| 7,819,610 B2* | 10/2010 | Wallstrom ............ B23C 5/2213 407/113 |
| 8,974,154 B2* | 3/2015 | Hoefler ................ B23C 5/2247 407/101 |
| 9,511,427 B2* | 12/2016 | Horiike ............... B23B 27/1611 |
| 2003/0017014 A1* | 1/2003 | Morgulis ................ B23C 5/109 407/34 |
| 2007/0224006 A1* | 9/2007 | Smilovici ............. B23C 5/2213 407/113 |
| 2014/0199127 A1* | 7/2014 | Imai ........................ B23C 5/202 407/42 |
| 2016/0023285 A1 | 1/2016 | Saji |
| 2017/0326658 A1 | 11/2017 | Oikawa et al. |
| 2018/0339350 A1* | 11/2018 | Mura ...................... B23C 5/207 |
| 2019/0351492 A1* | 11/2019 | Shiroma ................ B23C 5/207 |
| 2020/0338652 A1 | 10/2020 | Choi et al. |

FOREIGN PATENT DOCUMENTS

| | | | |
|---|---|---|---|
| JP | 2014-083632 | 5/2014 | |
| WO | WO 2011/122676 | 10/2011 | |
| WO | WO-2011122676 A1 * | 10/2011 | ............ B23C 5/109 |
| WO | WO-2013051449 A1 * | 4/2013 | ........... B23B 27/145 |

OTHER PUBLICATIONS

Supplementary European Search Report issued Jan. 18, 2024, in EP counterpart Application No. EP20913876.

* cited by examiner

Total displacement : 0.064 mm

Total displacement : 0.037 mm

INSERT AND CUTTING TOOL ASSEMBLY COMPRISING SAME

TECHNICAL FIELD

The present disclosure relates to an insert and a cutting tool assembly comprising same.

BACKGROUND

A cutting tool is mainly used for cutting an iron-based or non-iron-based metal and, when in use, is fixed to various machine tools. As a method of cutting a metal through the use of a cutting tool, there is known, for example, a method in which cutting is performed by bringing a cutting edge of a cutting tool into contact with a rotating metal workpiece. As another method, there is known a method in which a cutting insert having a cutting edge is fixed to a tool holder, the tool holder is fixed to a machine tool, and then the cutting insert is brought into contact with a workpiece fixed in advance while rotating the cutting insert through the rotation of the tool holder, thereby cutting the workpiece in a desired shape.

A cutting insert that makes direct contact with a workpiece is one of the important factors in a cutting process. Furthermore, the material and shape of the cutting insert affects the lifespan of a cutting tool and the machining quality. In addition, when a target work portion of a workpiece is to be cut and removed using a cutting insert, it is necessary to safely discharge metal scraps generated in the form of chips from a cutting area.

SUMMARY

Various embodiments of the present disclosure provide an insert in which a ridge portion of an upper surface and a ridge portion of a lower surface are formed so as to cross each other in a diagonal direction, and a cutting tool assembly comprising same.

Embodiments according to one aspect of the present disclosure is directed to an insert configured to be assembled to a tool for cutting a workpiece. The insert according to an exemplary embodiment includes: an upper surface including first to fourth upper corner portions formed in respective quadrants divided by a first imaginary vertical axis and a first imaginary horizontal axis that are perpendicular to each other; and a lower surface formed below the upper surface in a height direction and including first to fourth lower corner portions formed in respective quadrants divided by a second imaginary vertical axis and a second imaginary horizontal axis that are perpendicular to each other. The first upper corner portion and the first lower corner portion are respectively disposed on an upper side in a longitudinal direction of the tool and an inner side in a radial direction of the tool. The first to fourth upper corner portions are arranged in order in a counterclockwise direction with respect to the first upper corner portion. The first to fourth lower corner portions are arranged in order in a counterclockwise direction with respect to the first lower corner portion. A lower ridge portion protruding downward in the height direction is formed on the lower surface, and extends across the second and fourth lower corner portions, which are symmetrical with respect to a center of the lower surface.

In one embodiment, a cutting edge is formed at each of the first to fourth upper corner portions.

In one embodiment, an upper ridge portion protruding upward in the height direction is formed on the upper surface, and extends across the first and third upper corner portions, which are symmetrical with respect to a center of the upper surface.

In one embodiment, a first main cutting edge is formed at each of the first and third upper corner portions, and a first ramping cutting edge, which is angled to a surface of the workpiece, is formed at each of the second and fourth upper corner portions.

In one embodiment, the upper surface and the lower surface are respectively formed on an upper side and a lower side of a longitudinal center line perpendicular to the height direction and passing through a center in the height direction. A first thickness between the longitudinal center line and the first and third upper corner portions is larger than a second thickness between the longitudinal center line and the second and fourth upper corner portions.

In one embodiment, an angle between an extension line passing through the upper ridge portion and the first imaginary horizontal axis is between 30 degrees and 50 degrees.

In one embodiment, a second ramping cutting edge is formed at each of the first and third lower corner portions, and a second main cutting edge, which is angled to a surface of the workpiece, is formed at each of the second and fourth lower corner portions.

In one embodiment, the second and fourth upper corner portions include first and second planar portions, respectively, and each of the first and second planar portions consists of a flat surface. Further, the first and third lower corner portions include third and fourth planar portions, respectively, and each of the third and fourth planar portions consists of a flat surface.

In one embodiment, the lower surface includes first and second lower support surfaces formed on both sides of the lower ridge portion and inclined upward in the height direction. An angle between an extension line extending from the first lower support surface and an extension line extending from the second lower support surface is between 130 degrees and 150 degrees.

In one embodiment, a length of the upper surface along the first imaginary horizontal axis is longer than a length of the upper surface along the first imaginary vertical axis. A length of the lower surface along the second imaginary horizontal axis is longer than a length of the lower surface along the second imaginary vertical axis.

Embodiments according to one aspect of the present disclosure is directed to a cutting tool assembly. The cutting tool assembly according to an exemplary embodiment includes: an insert configured to cut a workpiece; a tool holder having an insert pocket formed at an end portion of the tool holder so that the insert is seated in the insert pocket; and a screw configured to fix the insert to the insert pocket, The insert includes: an upper surface including first to fourth upper corner portions formed in respective quadrants divided by a first imaginary vertical axis and a first imaginary horizontal axis that are perpendicular to each other; and a lower surface formed below the upper surface in a height direction and including first to fourth lower corner portions formed in respective quadrants divided by a second imaginary vertical axis and a second imaginary horizontal axis that are perpendicular to each other. The first upper corner portion and the first lower corner portion are respectively disposed on an upper side in a longitudinal direction of the tool and an inner side in a radial direction of the tool. The first to fourth upper corner portions are arranged in order in a counterclockwise direction with respect to the first upper corner portion. The first to fourth lower corner portions are arranged in order in a counterclockwise direction with respect to the first lower corner portion. The insert is disposed so that the lower surface faces the insert pocket. A lower ridge portion protruding downward in the height direction is formed on the lower surface and extends across the second and fourth lower corner portions, which are symmetrical with respect to a center of the lower surface.

In one embodiment, the tool holder is configured to rotate about a rotation axis, the insert pocket is formed radially outward from the rotation axis in the tool holder. The third upper corner portion is disposed more radially outward than the second upper corner portion in a state in which the insert is fixed to the insert pocket.

In one embodiment, the insert pocket includes a ridge groove formed to accommodate the lower ridge portion. The insert pocket further includes first and second bottom surfaces formed on both sides of the ridge groove and inclined upward in the height direction. The insert pocket further includes a radial surface and an axial surface formed above the first and second bottom surfaces in the height direction.

In one embodiment, the lower surface includes first and second lower support surfaces formed on both sides of the lower ridge portion and inclined upward in the height direction. The first lower support surface is configured to make contact with the first bottom surface. The second lower support surface is configured to make contact with the second bottom surface. A first side surface between the first and second upper corner portions of the insert is configured to make contact with the radial surface. A second side surface between the first and fourth upper corner portions of the insert is configured to make contact with the axial surface.

In one embodiment, in a milling process, a feed component force acting on the insert is supported by the first bottom surface and the radial surface.

In one embodiment, in a ramping cutting process, a feed component force acting on the insert is supported by the first bottom surface and the axial surface.

BRIEF DESCRIPTION OF DRAWINGS

The accompanying drawings, which are incorporated in and constitute a part of the specification, illustrate embodiments of the present disclosure.

DETAILED DESCRIPTION

Figure 1:
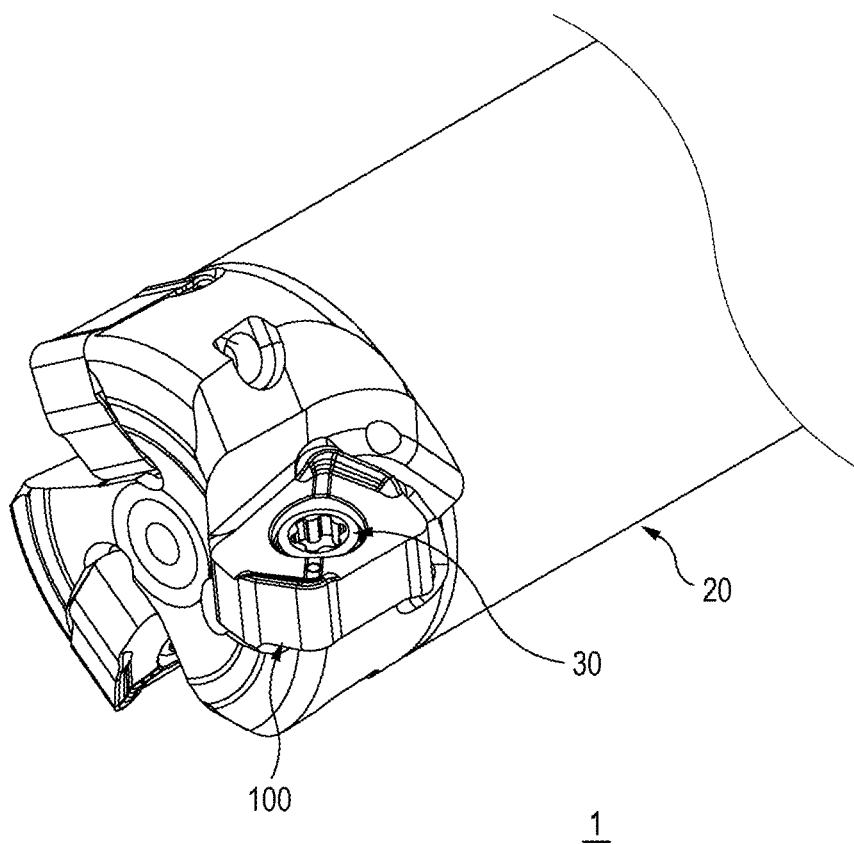
FIG. 1 is a perspective view showing a cutting tool assembly according to an embodiment of the present disclosure.

Embodiments of the present disclosure are illustrated for the purpose of explaining the technical idea of the present disclosure. The scope of the rights according to the present disclosure is not limited to the embodiments presented below or the detailed descriptions of such embodiments.

All the technical terms and scientific terms in the present disclosure include meanings or definitions that are commonly understood by those of ordinary skill in the art unless otherwise defined. All terms in the present disclosure are selected for the purpose of describing the present disclosure more clearly, and are not selected to limit the scope of the present disclosure.

As used in the present disclosure, expressions such as "comprising," "including," "having," and the like are to be understood as open-ended terms having the possibility of encompassing other embodiments, unless otherwise mentioned in the phrase or sentence containing such expressions.

The singular expressions that are described in the present disclosure may encompass plural expressions unless otherwise stated, which will be also applied to the singular expressions recited in the claims.

The expressions, such as "first," "second," etc., which are shown in various embodiments of the present disclosure, are used to separate a plurality of elements from each other, and are not intended to limit an order or importance of the corresponding elements.

The directional term "upward," "upper," etc., used herein is based on a direction in which an upper face is positioned with respect to a lower face in the accompanying drawings. The directional term "downward," "lower," etc., means a direction opposite to the upward or upper direction. A cutting insert shown in the accompanying drawings may be otherwise oriented and the above-described directional terms may be interpreted accordingly.

Hereinafter, embodiments of the present disclosure will be described with reference to the accompanying drawings. In the accompanying drawings, like or relevant components are indicated by like reference numerals. In the following description of embodiments, repeated descriptions of the identical or relevant components will be omitted. However, even if a description of a component is omitted, such a component is not intended to be excluded in an embodiment.

Figure 2:
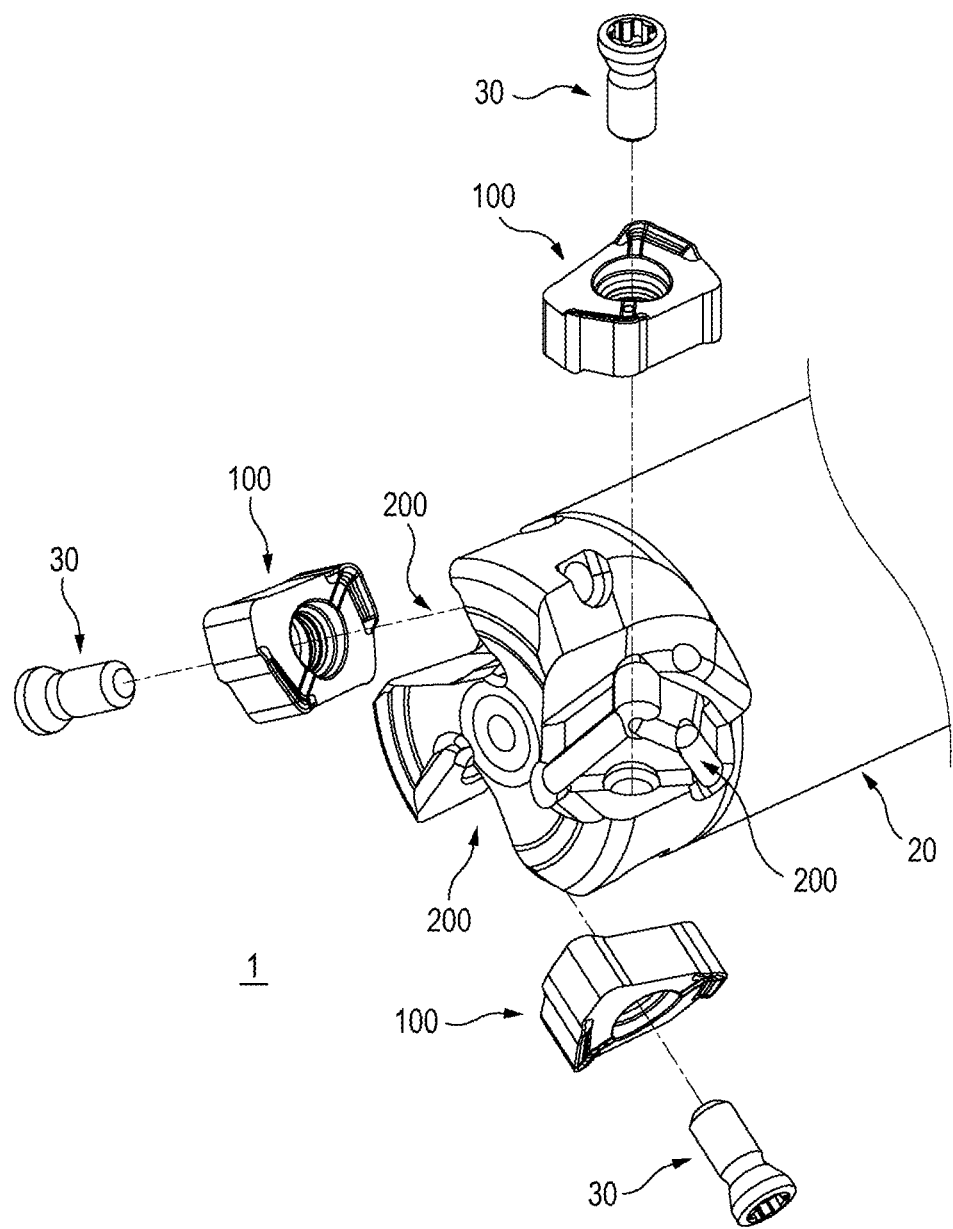
FIG. 2 is an exploded perspective view of the cutting tool assembly shown in FIG. 1.
Figure 3:
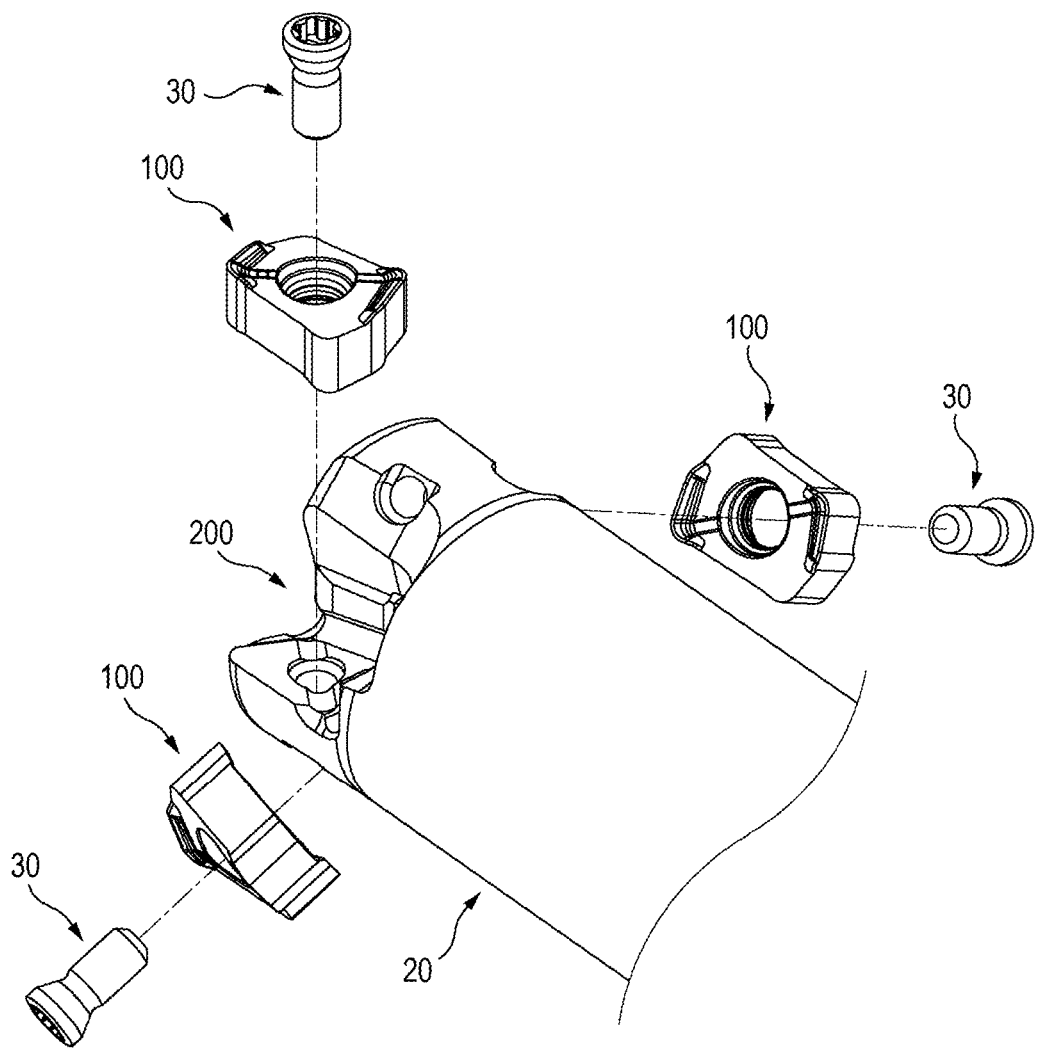
FIG. 3 is an exploded perspective view showing a configuration of the cutting tool assembly shown in FIG. 1 as viewed from a direction different from that of FIG. 2.

FIG. 1 is a perspective view showing a cutting tool assembly 1 according to an embodiment of the present disclosure. FIG. 2 is an exploded perspective view of the cutting tool assembly 1 shown in FIG. 1. FIG. 3 is an exploded perspective view showing a configuration of the cutting tool assembly 1 shown in FIG. 1 as viewed from a direction different from that of FIG. 2.

The cutting tool assembly 1 may be used in a milling machine. The cutting tool assembly 1 may be installed in a milling machine and configured to cut a workpiece while rotating by itself. The cutting tool assembly 1 may include a tool holder 20, an insert 100 and a screw 30.

The tool holder 20 may have, for example, a rotary body shape and may be configured to rotate about a rotation axis RA. At least one insert pocket 200 may be formed at an end portion of the tool holder 20. The insert pocket 200 may be formed in the tool holder 20 to extend radially outward from the rotation axis RA. The insert 100 may be seated in the insert pocket 200 by the screw 30. The screw 30 may be fastened to the bottom portion of the insert pocket 200 by penetrating the insert 100.

Referring to FIGS. 1 to 3, three insert pockets 200 may be formed at the end portion of the tool holder 20, and three inserts 100 may be provided correspondingly. The insert pockets 200 may be disposed at angular intervals of 120° in the circumferential direction. The insert 100 may have a main cutting edge and a ramping cutting edge, which is angled to a surface of the workpiece. In a state in which the insert 100 is fixed to the insert pocket 200, the main cutting edge may be arranged to face more radially outward than the ramping cutting edge. Details related to this will be described later.

Figure 4:
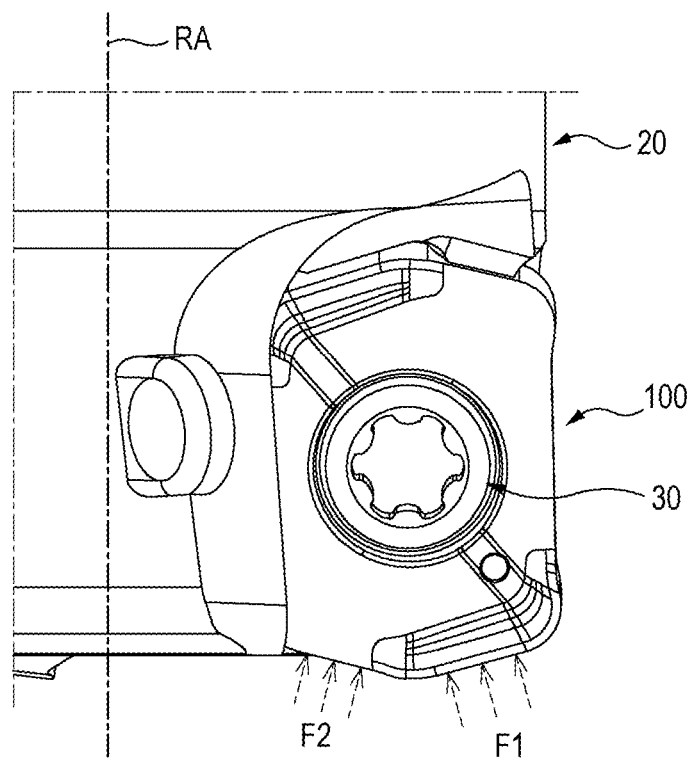
FIG. 4 is a view showing a force received by an insert when the cutting tool assembly shown in FIG. 1 is used for machining.
Figure 5:
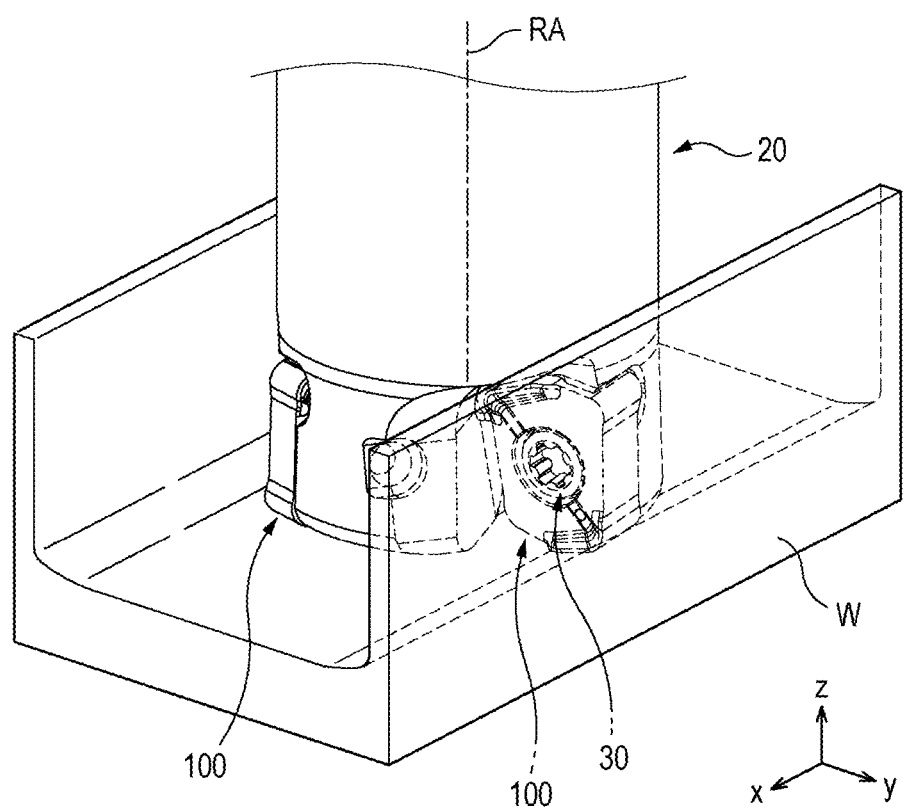
FIG. 5 is a view showing a state in which the cutting tool assembly shown in FIG. 1 is used in a general cutting process.
Figure 6:
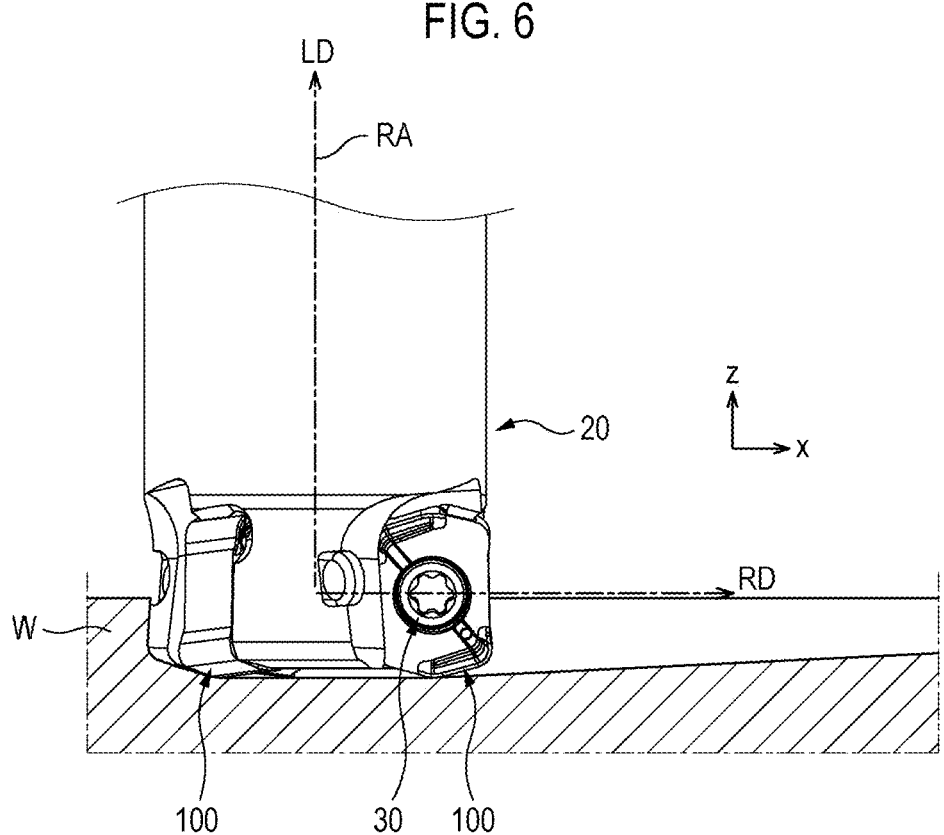
FIG. 6 is a view showing the cutting tool assembly shown in FIG. 1, which is used in a ramping cutting process.

FIG. 4 is a view showing the force received by the insert 100 when the cutting tool assembly 1 shown in FIG. 1 is used for machining. FIG. 5 is a view showing a state in which the cutting tool assembly 1 shown in FIG. 1 is used in a general cutting process. FIG. 6 is a view showing the cutting tool assembly 1 shown in FIG. 1, which is used in a ramping cutting process. The insert 100 may cut the workpiece W while rotating about the rotation axis RA.

Referring to FIG. 6, a direction parallel to the rotation axis RA may be defined as a longitudinal direction LD of the tool holder 20. In addition, a direction perpendicular to the rotation axis RA may be defined as a radial direction RD of the tool holder 20.

Referring to the coordinate system shown in FIG. 5, in the general cutting process, the cutting tool assembly 1 moves in the X- or Y-axis direction perpendicular to the rotation axis RA, but does not move in the Z-axis direction parallel to the rotation axis RA. In this regard, the X-axis direction may be the feed direction of the cutting tool assembly 1. Accordingly, the workpiece W mainly makes contact with the main cutting edge of the insert 100 and has a small ratio of contact with the ramping cutting edge. Referring to FIG. 4, the main cutting force F1 acting on the main cutting edge may be greater than the ramping cutting force F2 acting on the ramping cutting edge.

Referring to the coordinate system shown in FIG. 6, in the ramping cutting process, the cutting tool assembly 1 moves in the X- or Y-axis direction perpendicular to the rotation axis RA and also moves in the Z-axis direction parallel to the rotation axis RA. For example, the ramping angle may be between 1 degree and 2 degrees during ramp cutting. That is, the moving speed of the cutting tool assembly 1 along the Z-axis is significantly lower than the moving speed of the cutting tool assembly 1 along the X-axis. Therefore, the workpiece W is mainly in contact with the ramping cutting edge of the insert 100, and the ratio of contact of the workpiece W with the main cutting edge is lowered. Referring to FIG. 4, the main cutting force F1 acting on the main cutting edge may be greater than the ramping cutting force F2 acting on the ramping cutting edge.

Figure 7:
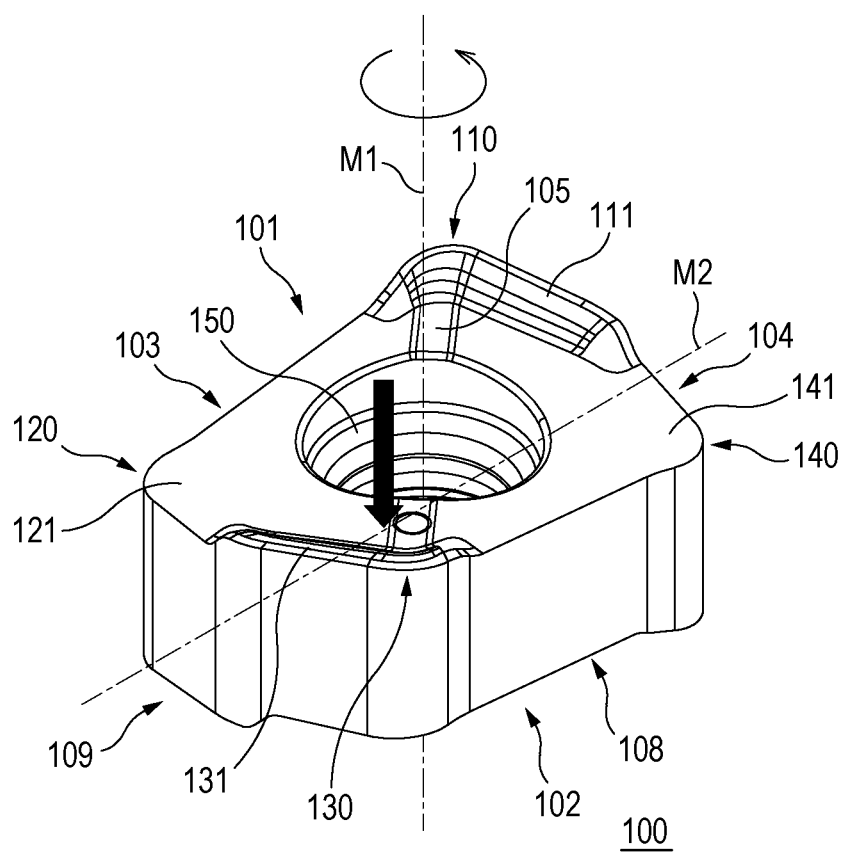
FIG. 7 is a perspective view showing an insert according to an embodiment of the present disclosure.
Figure 8:
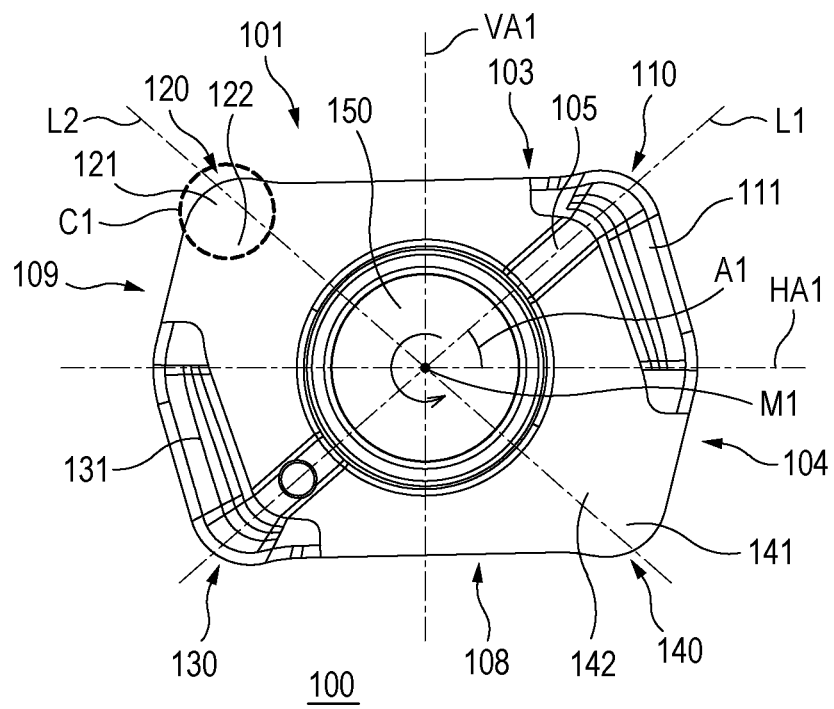
FIG. 8 is a top view showing an upper surface of the insert shown in FIG. 7.
Figure 9:
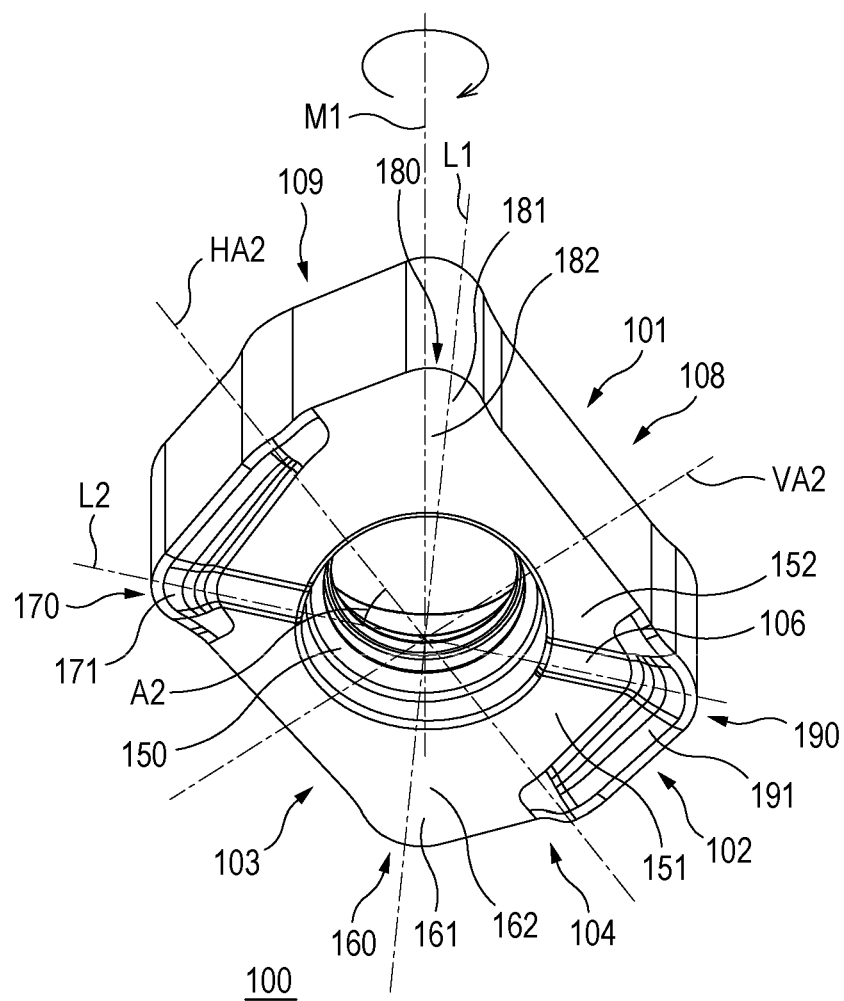
FIG. 9 is a perspective view showing a lower surface of the insert shown in FIG. 7.
Figure 10:
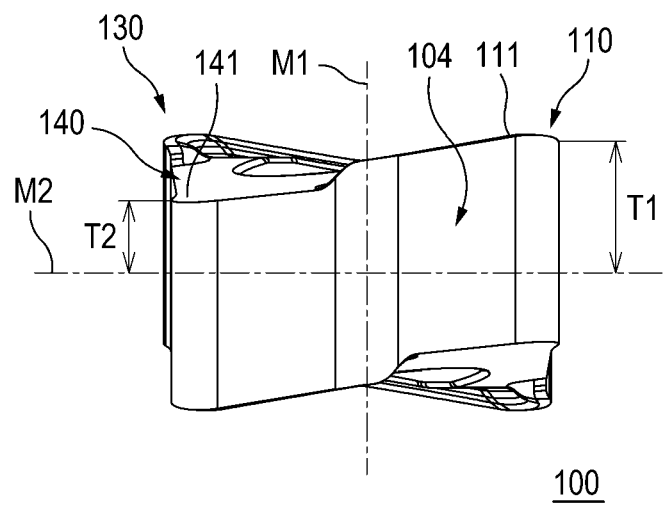
FIG. 10 is a side view a side surface of the insert shown in FIG. 7.
Figure 11:
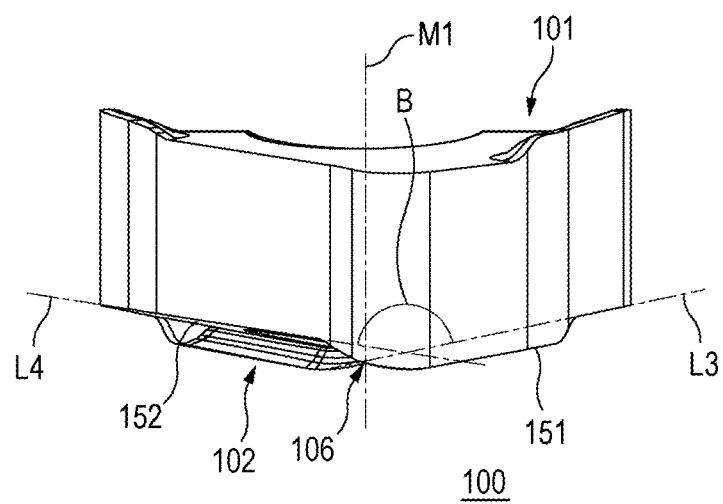
FIG. 11 is a side view showing the insert shown in FIG. 7 as viewed in a diagonal direction.

FIG. 7 is a perspective view showing the insert 100 according to an embodiment of the present disclosure. FIG. 8 is a top view showing the upper surface of the insert 100 shown in FIG. 7. FIG. 9 is a perspective view showing the lower surface of the insert 100 shown in FIG. 7. FIG. 10 is a side view the side surface of the insert 100 shown in FIG. 7. FIG. 11 is a side view showing the insert 100 shown in FIG. 7 as viewed in a diagonal direction.

Referring to FIG. 7, the insert 100 may be composed of a double-sided insert, and may include an upper surface 101, a lower surface 102 and first to fourth side surfaces 103, 104, 108 and 109. The insert 100 may have a height direction center line M1 passing through the center in the width direction and a length direction center line M2 passing through the center in the height direction. The point where the height direction center line M1 and the length direction center line M2 intersect may be the center of mass of the insert 100. The upper surface 101 and the lower surface 102 are respectively formed above and below the length direction center line M2. More precisely, the upper and lower surfaces are formed on opposite sides of an imaginary median plane which is perpendicular to the height direction centerline M1 and contains the length direction center line M2. The insert 100 may have an opening 150 penetrated along the height direction center line M1. The screw 30 shown in FIG. 2 may pass through the opening 150. As seen in the FIG. 7, the height direction center line M1 passes through the upper surface 101 and the lower surface 102. The insert has 180° rotational symmetry about the height direction centerline M1.

Referring to FIG. 8, the upper surface 101 may include first to fourth upper corner portions 110, 120, 130 and 140 formed in the respective quadrants divided by a first imaginary horizontal axis HA1 and a first imaginary vertical axis VA1 that are perpendicular to each other. The length of the upper surface 101 along the direction of the first imaginary horizontal axis HA1 may be longer than the length of the upper surface 101 along the direction of the first imaginary vertical axis VA1. An upper ridge portion 105 extending across the first and third upper corner portions 110 and 130, which are symmetrical with respect to the center of the upper surface 101, and protruding upward in the height direction may be formed on the upper surface 101.

Referring to FIG. 8, in the insert 100, the first side surface 103 refers to the side surface formed between the first and second upper corner portions 110 and 120, the second side surface 104 refers to the side surface formed between the first and fourth upper corner portions 110 and 140, the third side surface 108 refers to the side surface formed between the third and fourth upper corner portions 130 and 140, and the fourth side surface 109 refers to the side surface formed between the second and third upper corner portions 120 and 130.

Meanwhile, when the insert 100 is fixed to the insert pocket 200 (see FIG. 5), the second and third upper corner portions 120 and 130 may be located closer to the end portion of the tool holder 20 than the first and fourth upper corner portions 110 and 140. In addition, the third upper corner portion 130 may be disposed more radially outward than the second upper corner portion 120.

Referring to FIG. 9, the lower surface 102 is formed on the lower side in the height direction with respect to the upper surface 101. The lower surface 102 may include first to fourth lower corner portions 160, 170, 180 and 190 formed in the respective quadrants divided by a second imaginary vertical axis VA2 and a second imaginary horizontal axis HA2 that are perpendicular to each other. The length of the lower surface 102 along the direction of the second imaginary horizontal axis HA2 may be longer than the length of the lower surface 102 along the direction of the second imaginary vertical axis VA2. A lower ridge portion 106 extending across the second and fourth lower corner portions 170 and 190, which are symmetrical with respect to the center of the lower surface 102, and protruding downward in the height direction may be formed on the lower surface 102.

The first to fourth lower corner portions 160, 170, 180 and 190 are sequentially located below the first to fourth upper corner portions 110, 120, 130 and 140, respectively, in the height direction. Therefore, the upper ridge portion 105 and the lower ridge portion 106 intersect in the diagonal direction based on the direction viewed from the upper or lower side of the insert 100.

Referring to FIG. 5, the first upper corner portion 110 and the first lower corner portion 160 are respectively disposed on an upper side in a longitudinal direction LD of the tool holder 20 and an inner side in a radial direction RD of the tool holder 20. The first to fourth upper corner portions 110, 120, 130, 140 are arranged in order in a counterclockwise direction with respect to the first upper corner portion 110, the counterclockwise direction being taken about the height direction center line M1 in a top view of the insert (FIG. 8). The first to fourth lower corner portions 160, 170, 180, 190 are arranged in order in a counterclockwise direction with respect to the first lower corner portion 160, the counterclockwise direction again being taken about the height direction center line M1 in a top view of the insert (FIG. 8).

On the upper surface 101, main cutting edges 111 and 131 may be formed at the first and third upper corner portions 110 and 130, respectively, and ramping cutting edges 121 and 141 may be formed at the second and fourth upper corner portions 120 and 140, respectively. On the lower surface 102, main cutting edges 171 and 191 may be formed at the second and fourth lower corner portions 170 and 190, respectively, and ramping cutting edges 161 and 181 may be formed at the first and third lower corner portions 160 and 180, respectively. In addition, the upper ridge portion 105 may be formed over the main cutting edges 111 and 131, and the lower ridge portion 106 may be formed over the main cutting edges 171 and 191.

The second and fourth upper corner portions 120 and 140 may include first and second planar portions 122 and 142, respectively, and each of the first and second planar portions consists of a flat surface. The first and third lower corner portions 160 and 180 may include third and fourth planar portions 162 and 182, respectively, and each of the third and fourth planar portions consists of a flat surface. Accordingly, the first and second planar portions 122 and 142 may be positioned below the first and third upper corner portions 110 and 130 in the height direction. In addition, the third and fourth planar portions 162 and 182 may be positioned above the second and fourth lower corner portions 170 and 190 in the height direction.

Referring to FIG. 8, the angle A1 between the extension line L1 passing through the upper ridge portion 105 and the first imaginary horizontal axis HA1 may be between 30 degrees and 50 degrees. Similarly, the angle A2 between the extension line L2 passing through the lower ridge portion 106 and the second imaginary horizontal axis HA2 may be between 30 degrees and 50 degrees.

Referring to FIGS. 8 and 9, the extension line L1 passing through the upper ridge portion 105 and the extension line L2 passing through the lower ridge portion 106 may be arranged in different directions (i.e., in cross directions). The arrow shown in FIG. 8 represents a situation in which a large force is applied to the main cutting edge 131 in the general milling process. If the extension line L1 and the extension line L2 are arranged in the same direction, a circular portion C1 of the lower surface 102 has a ridge or valley shape, the stability during the general milling operation may be decreased in this case. On the contrary, according to one embodiment of the present disclosure, since the extension line L1 and the extension line L2 are arranged in directions crossing each other and since the circle portion C1 of the lower surface 102 consists of a generally flat surface, the insert 100 can be stably supported by the tool holder 20. Therefore, the stability in the general milling process can be improved.

Referring to FIG. 10, the first thickness T1 between the longitudinal center line M2 and the first and third upper corner portions 110 and 130 may be larger than the second thickness T2 between the longitudinal center line M2 and the second and fourth upper corner portions 120 and 140. Therefore, the insert 100 may perform cutting more smoothly in conformity with the ramping angle at the time of ramping cutting process.

Referring to FIG. 9, the lower surface 102 may include first and second lower support surfaces 151 and 152 formed on both sides of the lower ridge portion 106 and inclined upward in the height direction. In the double-sided insert, the upper surface 101 may similarly have first and second upper support surfaces formed on both sides of the upper ridge portion 105, but inclined downward in the height direction. Referring to FIG. 11, the angle B between the extension line L3 extending from the first lower support surface 151 and the extension line L4 extending from the second lower support surface 152 may be between 130 degrees and 150 degrees.

Figure 12:
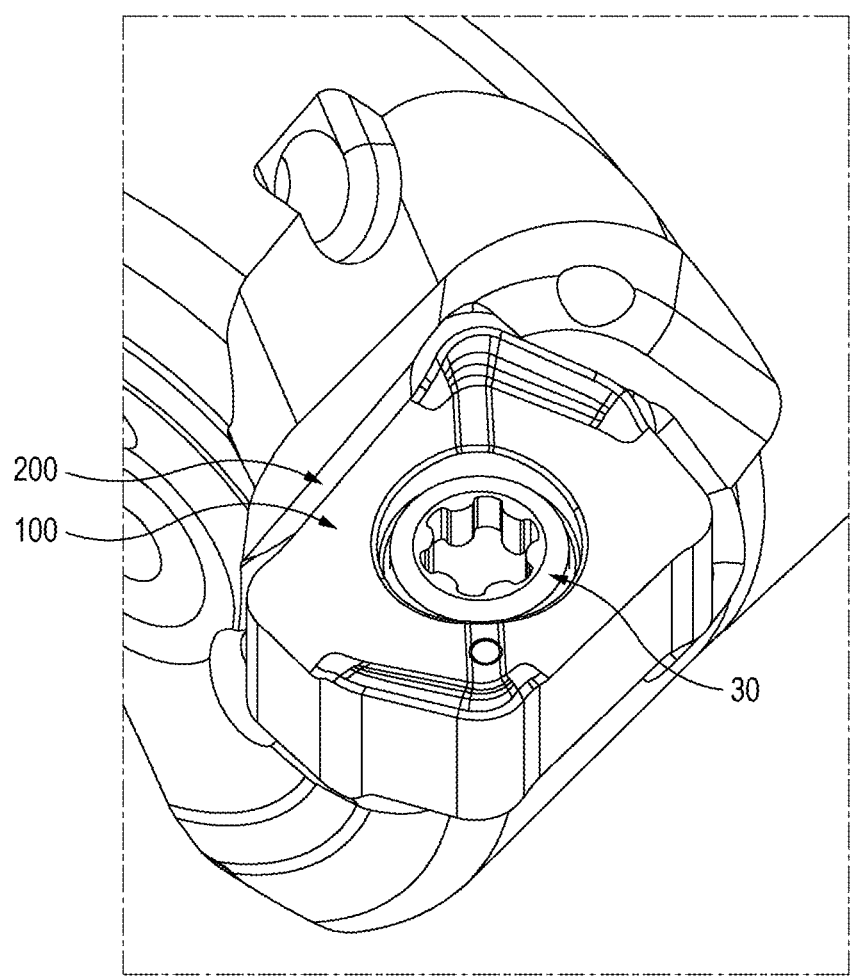
FIG. 12 is an enlarged perspective view of the insert fastened to a tool holder in FIG. 1.
Figure 13:
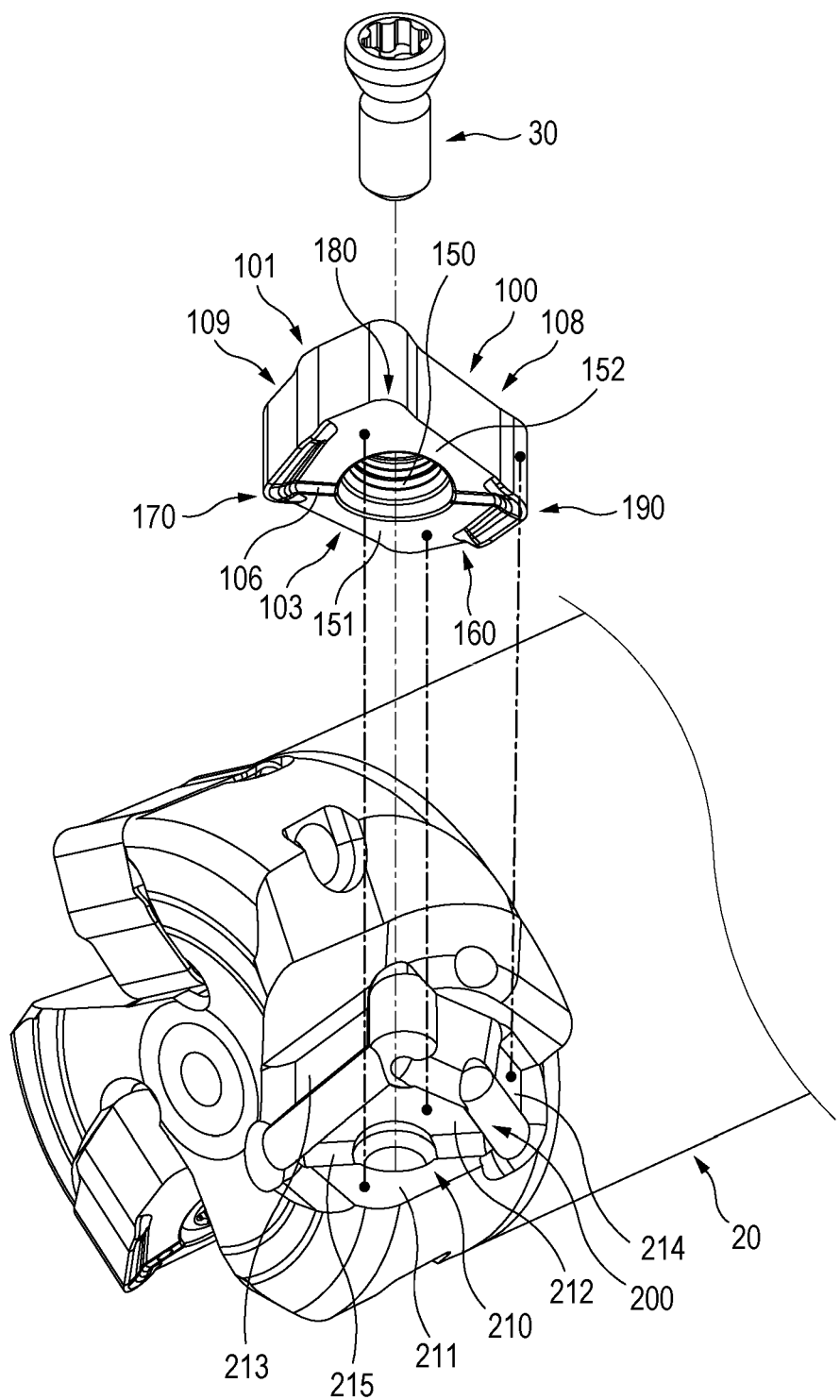
FIG. 13 is a view for explaining a configuration in which the lower surface of the insert shown in FIG. 12 is supported in the tool holder.

FIG. 12 is an enlarged perspective view showing a state in which the insert 100 is fastened to the tool holder in FIG. 1. FIG. 13 is a view for explaining a configuration in which the lower surface 102 of the insert 100 shown in FIG. 12 is supported in the tool holder.

The insert pocket 200 may include a bottom surface 210 that makes contact with the insert 100. A ridge groove 215 may be formed on the bottom surface 210 to accommodate the lower ridge portion 106. The bottom surface 210 may further include first and second bottom surfaces 211 and 212 formed on both sides of the ridge groove 215 and inclined upward in the height direction. In addition, the insert pocket 200 may further include a radial surface 213 and an axial surface 214 formed above the first and second bottom surfaces 211 and 212 in the height direction.

The first lower support surface 151 of the insert 100 may be configured to make contact with the first bottom surface 211 of the insert pocket 200. The second lower support surface 152 of the insert 100 may be configured to make contact with the second bottom surface 212 of the insert pocket 200. When the insert 100 is fixed to the insert pocket 200 by the screw 30, the first side surface 103 of the insert 100 may be configured to make contact with the radial surface 213 of the insert pocket 200, and the second side surface 104 of the insert 100 may be configured to make contact with the axial surface 214 of the insert pocket 200.

A cutting resistance refers to the resistance received by the insert when cutting is in progress. The cutting resistance may act as three component forces (a principal component force, a feed component force and a back component force) that are perpendicular to each other. The principal component force is the largest, the back component force is smaller than the principal component force, and the feed component force is smaller than the back component force. The principal component force may be referred to as a component force parallel to the cutting direction, the feed component force may be referred to as a component force acting in the direction opposite to the feed direction of the cutting tool assembly, and the back component force may be referred to as a component force in the direction opposite to the cutting depth.

If the lower surface of the insert consists only of a flat surface, the force acting in the radial direction of a milling cutter is supported by the radial contact surface of the tool holder, which makes it possible to keep the insert strongly fastened to the tool holder during machining. However, there is no separate support surface for the force acting in the direction opposite to the radial direction of the milling cutter under a situation such as ramping cutting process or the like. Since the insert is supported only by the screw, problems such as screw deformation, broken insert dropout, and the like may occur. According to the embodiment of the present disclosure, the lower surface 102 of the insert 100 is not composed of only a flat surface. It is therefore possible to solve the above problems.

When the insert 100 is used in a general milling process, the principal component force acting on the insert 100 may be supported by the first bottom surface 211 and the second bottom surface 212. The feed component force, which is a force acting in the radial direction of the cutting tool with respect to the insert 100, may be mainly supported by the second bottom surface 212 and additionally supported by the radial surface 213. On the other hand, the back component force acting on the insert 100 may be supported by the second bottom surface 212 and the axial surface 214.

In the case of using the insert 100 in ramping cutting process, the principal component force acting on the insert 100 may be supported by the first bottom surface 211 and the second bottom surface 212 as in the case of the general milling process. Unlike the general milling process, the feed component force, which is a force acting in the radial direction of the cutting tool with respect to the insert 100, may be supported by the first bottom surface 211 and the axial surface 214. On the other hand, the back component force acting on the insert 100 may be supported by the second bottom surface 212 and the axial surface 214.

Figure 14A:
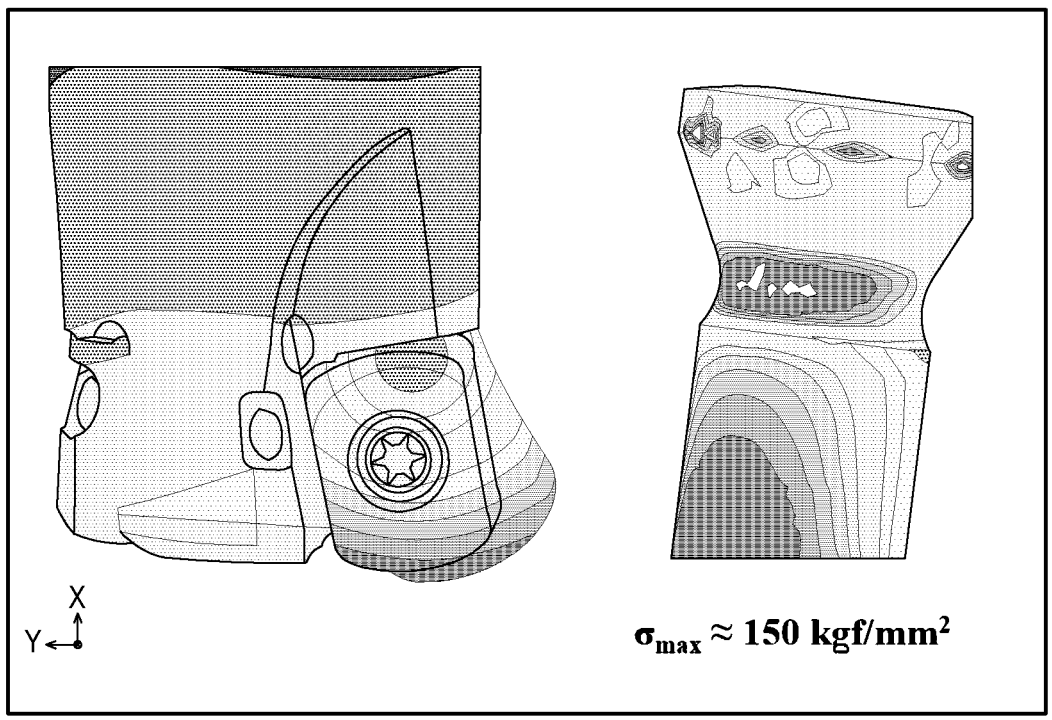
FIGS. 14A and 14B are views for comparing the performance of a cutting tool assembly according to a comparative example with the performance of the cutting tool assembly according to an embodiment of the present disclosure.
Figure 14B:
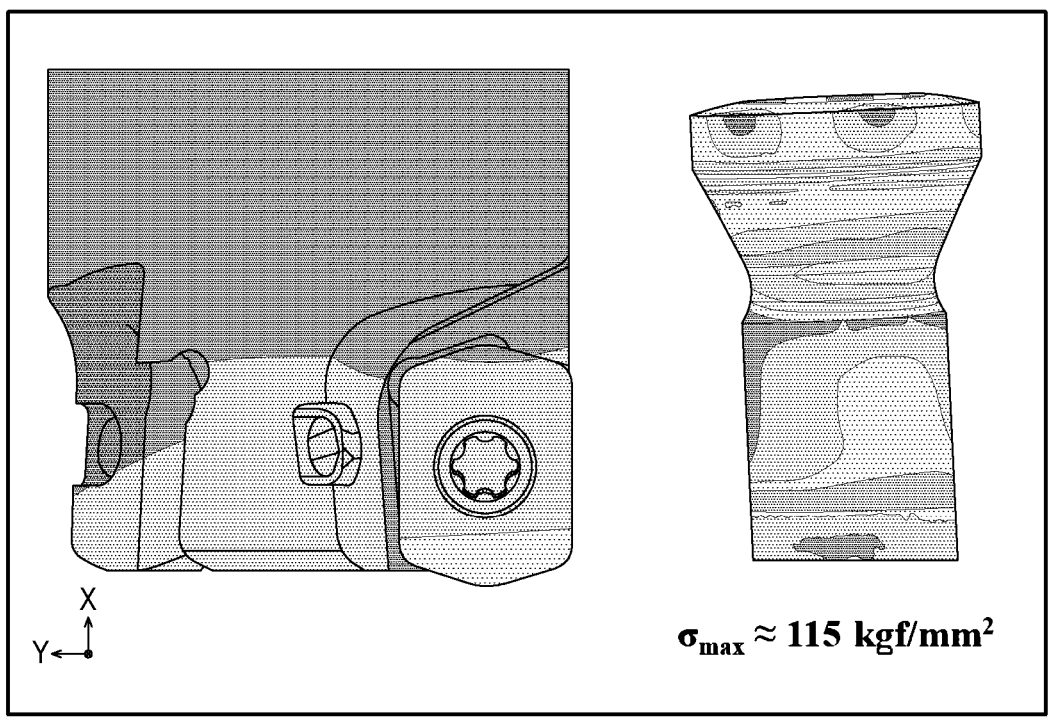

FIGS. 14A and 14B are views for comparing the performance of a cutting tool assembly according to a comparative example with the performance of the cutting tool assembly 1 according to an embodiment of the present disclosure.

FIG. 14A shows the screw stress σ and the total displacement of a cutting tool assembly according to a comparative example, and FIG. 14B shows the screw stress σ and the total displacement of the cutting tool assembly 1 according to an embodiment of the present disclosure. The screw stress σ represents the load acting on the screw and the total displacement represents the extent to which the insert has moved from its initial position.

It can be seen that the screw stress of the cutting tool assembly 1 according to an embodiment of the present disclosure is approximately 30% smaller than the screw stress of the cutting tool assembly according to the comparative example. Accordingly, the load acting on the screw is drastically reduced. Therefore, it is possible to prevent breakage of the screw even when performing highly intensive machining for a long period of time.

It can be seen that the total displacement of the cutting tool assembly 1 according to an embodiment of the present disclosure is approximately 40% smaller than the total displacement of the cutting tool assembly according to the comparative example. Accordingly, the total displacement can be drastically reduced during machining. Therefore, it is possible to maintain cutting precision even when performing highly intensive machining for a long period of time.

Figure 15:
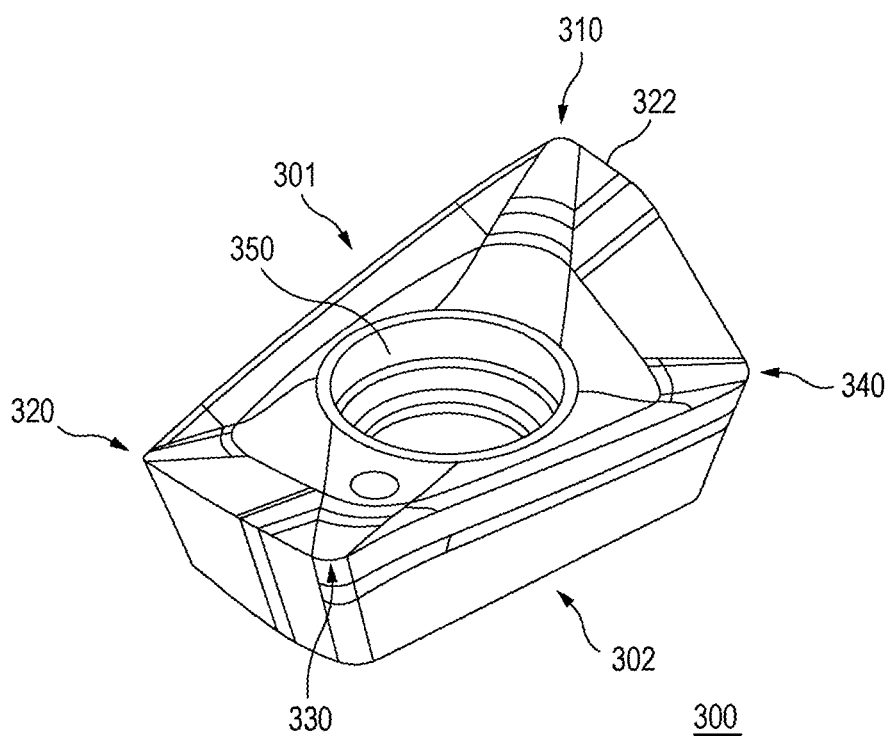
FIG. 15 is a perspective view showing an insert according to another embodiment of the present disclosure.
Figure 16:
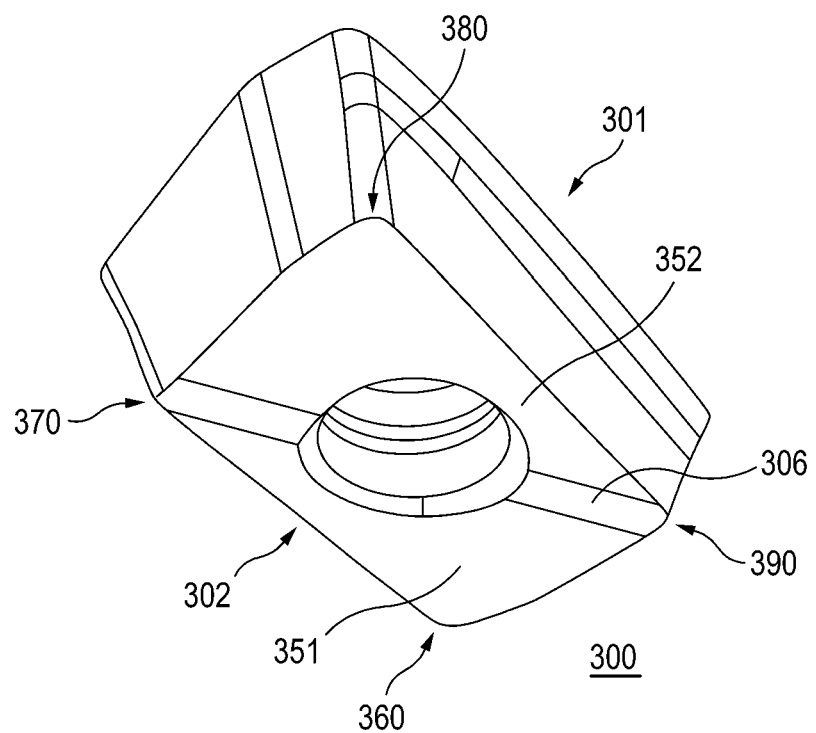
FIG. 16 is a perspective view showing a lower surface of the insert shown in FIG. 15.

FIG. 15 is a perspective view showing an insert 300 according to another embodiment of the present disclosure. FIG. 16 is a perspective view showing the lower surface of the insert 300 shown in FIG. 15. Duplicate descriptions on the contents described in the above-described embodiment will be omitted.

The insert 300 may be composed of a one-surface type insert. The insert 300 may have an opening 350 penetrating from an upper surface 301 to a lower surface 302. Therefore, a cutting edge may be formed only on the upper surface 301 of the insert 300, and no cutting edge may be formed on the lower surface 302. Meanwhile, a cutting edge may be formed in each of the first to fourth upper corner portions 310, 320, 330 and 340 of the upper surface 301.

The lower surface 302 may perform a function of seating in the insert pocket 200 of the tool holder 20. The lower surface 302 may include first to fourth lower corner portions 360, 370, 380 and 390. A lower ridge portion 306 extending across the second lower corner portion 370 and the fourth lower corner portion 390 may be formed. The lower surface 302 may include first and second lower support surfaces 351 and 352 formed on both sides of the lower ridge portion 306 and inclined upward in the height direction.

According to the above-described embodiments, due to the V-shaped protruding portion (lower ridge portion) of the lower surface of the insert, the insert can be stably fastened to the tool holder even in three-dimensional cutting such as rotational direction cutting, radial direction cutting and axial direction cutting of a milling cutter. This enables the insert to perform high speed feeding and high angle cutting, and the workpiece cutting productivity can be improved.

According to various embodiments of the present disclosure, the insert can be stably fastened to the tool holder by the ridge portion formed on the upper surface or the ridge portion formed on the lower surface. Therefore, even when performing high speed feeding or high angle cutting, it is possible to minimize the change in the position of the insert in the tool holder and to prevent the breakage of the insert itself and the removal of the insert from the tool holder.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A rectangular insert configured to be assembled to a tool holder for cutting a workpiece, the insert comprising:
   an upper surface including first, second, third, and fourth upper corner portions formed in respective quadrants divided by a first imaginary vertical axis and a first imaginary horizontal axis that are perpendicular to each other;
   a lower surface formed below the upper surface in a height direction and including first, second, third, and fourth lower corner portions formed in respective quadrants divided by a second imaginary vertical axis and a second imaginary horizontal axis that are perpendicular to each other, the first lower corner portion and the second lower corner portion defining a first side surface therebetween, the second lower corner portion and the third lower corner portion defining a second side surface therebetween, the first side surface having a first length in a direction parallel to the second imaginary horizontal axis, the second side surface having a second length in a direction parallel to the second imaginary vertical axis, the second length being different from the first length, and a height direction center line (M1) passing through the upper surface and the lower surface, wherein the first upper corner portion and the first lower corner portion are respectively disposed on an upper side in a longitudinal direction of the tool holder and an inner side in a radial direction of the tool holder, wherein the first, second, third, and fourth upper corner portions are arranged in order in a counterclockwise direction about the height direction center line (M1) in a top view of the insert, with respect to the first upper corner portion, wherein the first, second, third, and fourth lower corner portions are arranged in order in the counterclockwise direction about the height direction center line (M1) in said top view of the insert, with respect to the first lower corner portion, wherein the second lower corner portion and the fourth lower corner portion are rotationally symmetrical with one another about said height direction center line, wherein the first lower corner portion and the third lower corner portion are rotationally symmetrical with one another about said height direction center line and are located above the second and fourth lower corner portions in the height direction, wherein the lower surface is configured to be seated in an insert pocket of the tool holder, wherein the lower surface comprises:
 a lower ridge portion protruding downward in the height direction and having a central longitudinal ridge axis, the central longitudinal ridge axis extending between the second and fourth lower corner portions in a diagonal direction, the lower ridge portion passing through the second and fourth lower corner portions;
 a first lower support surface formed on a side of the lower ridge portion; and
 a second lower support surface formed on an opposite side of the lower ridge portion, and wherein the first lower support surface extends from the lower ridge portion to a peripheral edge of the lower surface in the first lower corner portion, wherein the first lower support surface is inclined upward in the height direction from the lower ridge portion toward the first lower corner portion and the second lower support surface extends from the lower ridge portion to a peripheral edge of the lower surface in the third lower corner portion, wherein the second lower support surface is inclined upward in the height direction from the lower ridge portion toward the third lower corner portion.

2. The insert of claim 1, wherein a cutting edge is formed at each of the first, second, third, and fourth upper corner portions.

3. The insert of claim 1, wherein an upper ridge portion protruding upward in the height direction is formed on the upper surface, and extends across the first and third upper corner portions, which are rotationally symmetrical with respect to said height direction center line (M1).

4. The insert of claim 3, wherein a first main cutting edge is formed at each of the first and third upper corner portions, and a first ramping cutting edge, which is angled to a surface of the workpiece, is formed at each of the second and fourth upper corner portions.

5. The insert of claim 4, wherein the upper surface and the lower surface are respectively formed on an upper side and a lower side of a longitudinal center line perpendicular to the height direction and passing through a center in the height direction, and a first thickness, measured in the height direction, between the longitudinal center line and the first direction, between the longitudinal center line and the second and fourth upper corner portions.

6. The insert of claim 3, wherein an angle between an extension line passing through the upper ridge portion and the first imaginary horizontal axis is between 30 degrees and 50 degrees.

7. The insert of claim 4, wherein a second ramping cutting edge is formed at each of the first and third lower corner portions, and a second main cutting edge, which is angled to the surface of the workpiece, is formed at each of the second and fourth lower corner portions.

8. The insert of claim 7, wherein the second upper corner portion includes a first planar portion consisting of a first flat surface, the fourth upper corner portion includes a second planar portion consisting of a second flat surface, the first lower support surface includes a third planar portion consisting of a third flat surface, and the second lower support surface includes a fourth planar portion consisting of a fourth flat surface, the third planar portion extending from the first lower corner portion to the lower ridge portion and the fourth planar portion extending from the third lower corner portion to the lower ridge portion.

9. The insert of claim 1, wherein an angle between the first lower support surface and the second lower support surface is between 130 degrees and 150 degrees.

10. The insert of claim 1, wherein a third length of the upper surface along the first imaginary horizontal axis is longer than a fourth length of the upper surface along the first imaginary vertical axis, and a fifth length of the lower surface along the second imaginary horizontal axis is longer than a sixth length of the lower surface along the second imaginary vertical axis.

11. A cutting tool assembly, comprising:
 a tool holder having an insert pocket formed at an end portion of the tool holder, the insert pocket having a ridge groove defined therein;
 a rectangular insert configured to cut a workpiece, the insert seated in the insert pocket of the tool holder; and
 a screw fixing the insert to the insert pocket,
 wherein the insert includes:
  an upper surface including first, second, third, and fourth upper corner portions formed in respective quadrants divided by a first imaginary vertical axis and a first imaginary horizontal axis that are perpendicular to each other;
  a lower surface formed below the upper surface in a height direction and including first, second, third, and fourth lower corner portions formed in respective quadrants divided by a second imaginary vertical axis and a second imaginary horizontal axis that are perpendicular to each other, the first lower corner portion and the second lower corner portion defining a first side surface therebetween, the second lower corner portion and the third lower corner portion defining a second side surface therebetween, the first side surface having a first length in a direction parallel to the second imaginary horizontal axis, the second side surface having a second length in a direction parallel to the second imaginary vertical axis, the second length being different from the first length, and a height direction center line (M1) passing through the upper surface and the lower surface, wherein the first upper corner portion and the first lower corner portion are respectively disposed on an upper side in a longitudinal direction of the tool holder and an inner side in a radial direction of the tool holder, wherein the first, second, third, and fourth upper corner portions are arranged in order in a counterclockwise direction about the height direction center line (M1) in a top view of the insert, with respect to the first upper corner portion, wherein the first, second, third, and fourth lower corner portions are arranged in order in the counterclockwise direction about the height direction center line (M1) in said top view of the insert, with respect to the first lower corner portion, wherein the second lower corner portion and the fourth lower corner portion are rotationally symmetrical with respect to said height direction center line, wherein the first lower corner portion and the third lower corner portion are rotationally symmetrical with respect to said height direction center line and are located above the second and fourth lower corner portions in the height direction, wherein the insert is disposed so that the lower surface faces the insert pocket, wherein the lower surface comprises:
- a lower ridge portion protruding downward in the height direction and extending between the second and fourth lower corner portions in a diagonal direction passing through the second and fourth lower corner portions;
- a first lower support surface formed on a side of the lower ridge portion; and
- a second lower support surface formed on an opposite side of the lower ridge portion, and wherein the first lower support surface extends from the lower ridge portion to a peripheral edge of the lower surface in the first lower corner portion, wherein the first lower support surface is inclined upward in the height direction from the lower ridge portion toward the first lower corner portion and the second lower support surface extends from the lower ridge portion to a peripheral edge of the lower surface in the third lower corner portion, wherein the second lower support surface is inclined upward in the height direction from the lower ridge portion toward the third lower corner portion.

12. The cutting tool assembly of claim 11, wherein the tool holder is configured to rotate about a rotation axis, the insert pocket is formed radially outward from the rotation axis in the tool holder, and the third upper corner portion is disposed more radially outward than the second upper corner portion.

13. The cutting tool assembly of claim 11, wherein the ridge groove is formed to accommodate the lower ridge portion, the insert pocket further includes a first bottom surface formed on a side of the ridge groove and a second bottom surface formed on another side of the ridge groove, the first bottom surface and the second bottom surface inclined upward in the height direction, and the insert pocket further includes a radial surface and an axial surface formed above the first and second bottom surfaces in the height direction.

14. The cutting tool assembly of claim 13, wherein the first lower support surface is configured to make contact with the first bottom surface, the second lower support surface is configured to make contact with the second bottom surface, the first side surface between the first and second upper corner portions of the insert is configured to make contact with the radial surface, and the second side surface between the first and fourth upper corner portions of the insert is configured to make contact with the axial surface.

15. The cutting tool assembly of claim 13, wherein in a milling process, a feed component force acting on the insert is supported by the second bottom surface and the radial surface.

16. The cutting tool assembly of claim 13, wherein in a ramping cutting process, a feed component force acting on the insert is supported by the first bottom surface and the axial surface.

17. A rectangular cutting insert having a height direction centerline (M1) around which the insert has 180° rotational symmetry, the insert comprising:
- an upper surface including first, second, third, and fourth upper corner portions arranged in order in a counter-clockwise direction taken about said height direction center line (M1) in a top view of the insert, with respect to the first upper corner portion;
- a lower surface formed below the upper surface in a height direction of the cutting insert, and including a first lower corner portion below the first upper corner portion in the height direction, a second lower corner portion below the second upper corner portion in the height direction, a third lower corner portion below the third upper corner portion in the height direction, and a fourth lower corner portion below the fourth upper corner portion in the height direction;
- a first main cutting edge formed at the first upper corner portion;
- a second main cutting edge formed at the third upper corner portion;
- a first ramping cutting edge formed at the second upper corner portion;
- a second ramping cutting edge formed at the fourth upper corner portion; and
- an opening passing between the upper and lower surfaces, the opening having said height direction center line;

wherein the second lower corner portion and the fourth lower corner portion are rotationally symmetrical with respect to said height direction center line, wherein the first lower corner portion and the third lower corner portion are rotationally symmetrical with respect to said height direction center line and are located above the second and fourth lower corner portions in the height direction, wherein the lower surface comprises:
- a lower ridge portion protruding downward in the height direction and extending between the second and fourth lower corner portions in a diagonal direction passing through the second and fourth lower corner portions;
- a first lower support surface formed on a side of the lower ridge portion; and
- a second lower support surface formed on an opposite side of the lower ridge portion, wherein the first and second lower support surfaces are inclined upward in the height direction from the lower ridge portion and define an obtuse angle along the lower ridge portion, and wherein the first lower support surface extends from the lower ridge portion to a peripheral edge of the lower surface in the first lower corner portion, and the second lower support surface extends from the lower ridge portion to a peripheral edge of the lower surface in the third lower corner portion.

18. The rectangular cutting insert according to claim 17, wherein the obtuse angle defined by the first and second lower support surfaces along the lower ridge portion is between 130°-150°.

19. The rectangular cutting insert according to claim 18, wherein the insert is double-sided and comprises:

a third main cutting edge formed at the second lower corner portion;

a fourth main cutting edge formed at the fourth lower corner portion;

a third ramping cutting edge formed at the first lower corner portion;

a fourth ramping cutting edge formed at the third lower corner portion;

an upper ridge portion protruding upward in the height direction and extending in a diagonal direction between the first and third upper corner portions; and first and second upper support surfaces formed on opposite sides of the upper ridge portion, the first and second upper surfaces inclined downward in the height direction from the upper ridge portion and defining an obtuse angle along the upper ridge portion.

20. A cutting tool assembly, comprising:

a tool holder having an insert pocket formed at an end portion of the tool holder, the insert pocket having a ridge groove formed in a bottom surface of the insert pocket, the ridge groove extending from a radially outer rear portion of the insert pocket to a radially inner forward portion of the insert pocket; and a cutting insert in accordance with claim 17 seated in the insert pocket, with the lower ridge portion of the cutting insert occupying the ridge groove.

21. The cutting tool assembly according to claim 11, wherein:

the insert pocket has a ridge groove formed in a bottom surface of the insert pocket, the ridge groove extending from a radially outer rear portion of the insert pocket to a radially inner forward portion of the insert pocket; and the lower ridge portion of the cutting insert occupies the ridge groove.

* * * * *